United States Patent
Archer et al.

(10) Patent No.: US 10,578,070 B2
(45) Date of Patent: Mar. 3, 2020

(54) ROCKER PINION STARTER

(71) Applicant: Ford Global Technologies, LLC, Dearborn, MI (US)

(72) Inventors: Steven Michael Archer, Plymouth, MI (US); Norm Jerry Bird, Plymouth, MI (US); Xiaoyong Lu, Canton, MI (US); Nicholas Niemiec, Livonia, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 303 days.

(21) Appl. No.: 15/636,338

(22) Filed: Jun. 28, 2017

(65) Prior Publication Data
US 2018/0058411 A1 Mar. 1, 2018

Related U.S. Application Data

(60) Provisional application No. 62/378,559, filed on Aug. 23, 2016.

(51) Int. Cl.
| | |
|---|---|
| *F02N 15/02* | (2006.01) |
| *F02N 11/08* | (2006.01) |
| *F16D 43/14* | (2006.01) |
| *F02N 15/04* | (2006.01) |
| *F02N 11/04* | (2006.01) |

(52) U.S. Cl.
CPC ........ *F02N 11/0851* (2013.01); *F02N 15/023* (2013.01); *F16D 43/14* (2013.01); *F02N 11/04* (2013.01); *F02N 11/0814* (2013.01); *F02N 15/026* (2013.01); *F02N 15/027* (2013.01); *F02N 15/043* (2013.01); *F02N 2200/022* (2013.01); *F16D 2043/145* (2013.01)

(58) Field of Classification Search
CPC .............. F02N 11/0851; F02N 15/023; F02N 11/0814; F16D 43/14
See application file for complete search history.

(56) References Cited

U.S. PATENT DOCUMENTS

| | | | | |
|---|---|---|---|---|
| 2,955,584 A | * | 10/1960 | Vakos | F02N 5/02 123/179.1 |
| 4,986,140 A | * | 1/1991 | Morishita | F02N 15/023 192/45.018 |
| 6,089,112 A | * | 7/2000 | Kelly | F02N 15/023 123/179.25 |
| 6,374,791 B1 | * | 4/2002 | Kuwabara | F02N 3/02 123/179.24 |
| 8,240,286 B2 | | 8/2012 | Li et al. | |

(Continued)

FOREIGN PATENT DOCUMENTS

| | | |
|---|---|---|
| EP | 1293665 A2 | 3/2003 |
| EP | 1908954 A1 | 4/2008 |
| GB | 190200298 A | 12/1902 |

*Primary Examiner* — David M Fenstermacher
(74) *Attorney, Agent, or Firm* — Geoffrey Brumbaugh; McCoy Russell LLP

(57) ABSTRACT

Methods and systems are provided for starting a vehicle engine. In one example, an engine starter system for starting the vehicle engine may comprise a ring gear coupled to an engine crankshaft, and a pinion gear coupled to a starter motor, the pinion gear having rotatable rocker elements for engaging the ring gear. In this way, the pinion gear may be engaged with the ring gear to transmit torque from the starter motor to the engine crankshaft to quickly start the engine.

20 Claims, 12 Drawing Sheets

(56) References Cited

U.S. PATENT DOCUMENTS

| | | |
|---|---|---|
| 8,479,599 B2 | 7/2013 | Shiba et al. |
| 2005/0087417 A1* | 4/2005 | Shimomura .......... F02N 15/023 |
| | | 192/45.015 |
| 2012/0031231 A1* | 2/2012 | Schoenek ............. F02N 15/023 |
| | | 74/7 C |
| 2013/0133480 A1* | 5/2013 | Donnelly ................ B60K 6/36 |
| | | 74/720 |
| 2015/0013495 A1* | 1/2015 | Berruet ................ F02N 15/022 |
| | | 74/7 C |
| 2018/0320651 A1* | 11/2018 | Chen ................... F02N 11/0862 |

* cited by examiner

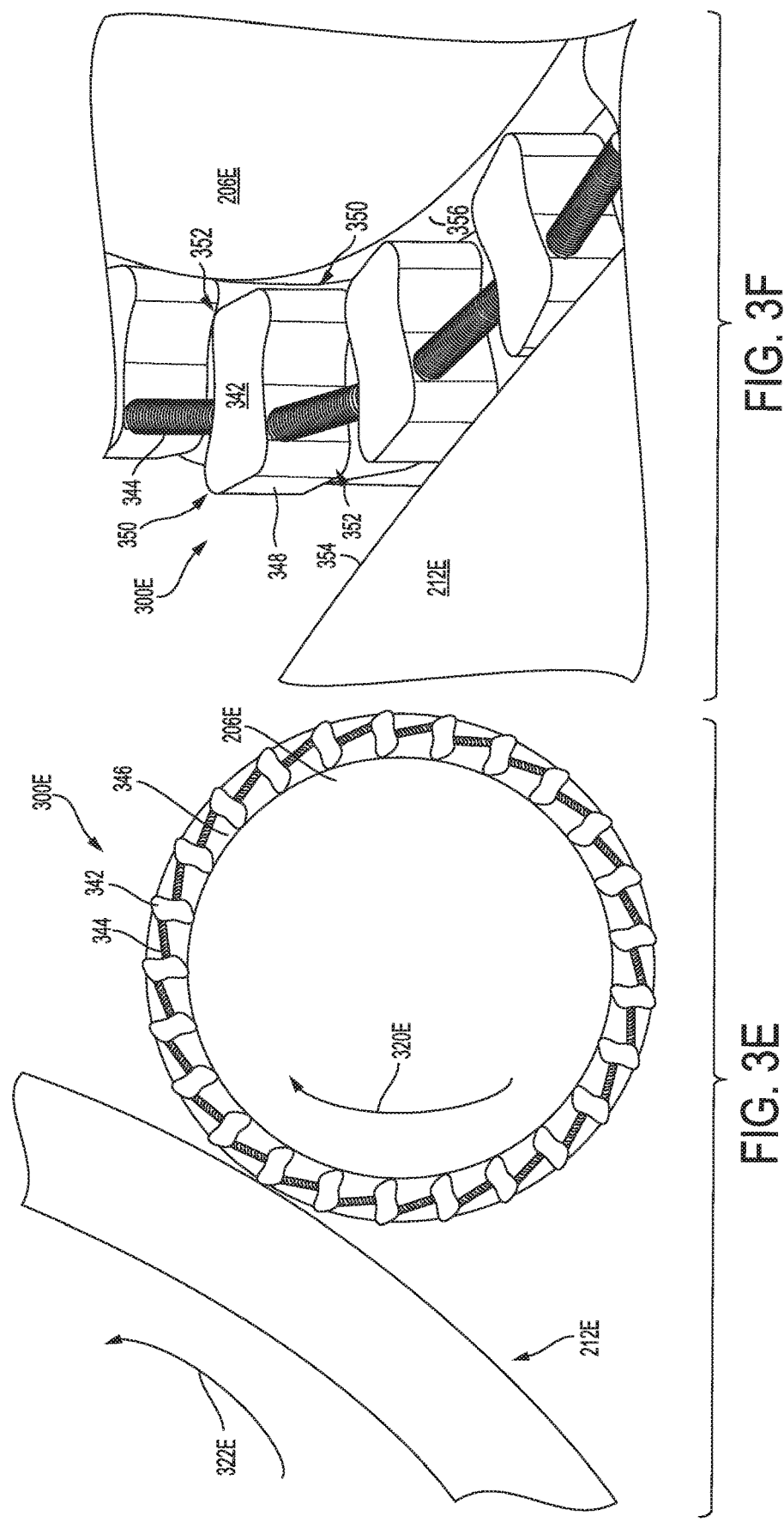

ROCKER PINION STARTER

CROSS REFERENCE TO RELATED APPLICATION

This application claims priority to U.S. Provisional Application No. 62/378,559, filed Aug. 23, 2016. The entire contents of the above-referenced application are hereby incorporated by reference in its entirety for all purposes.

FIELD

The present description relates generally to methods and systems for starting a vehicle engine using an engine starter with a starter motor, and a pinion gear brought into meshing contact with a ring gear coupled to an engine crankshaft.

BACKGROUND/SUMMARY

A vehicle engine may be started (or restarted after an idle stop) using an engine starter. An example of such starters may include a starter motor connected to a starter relay. The starter motor may be mechanically coupled via a drive shaft to a pinion gear which may be moved into a meshing position with a ring gear coupled to an engine crankshaft. During engine cranking, a battery delivers an electric current to the starter motor causing the drive shaft attached to the pinion gear to rotate, and thereby allowing the pinion gear to drive the ring gear. Once in meshing engagement with the pinion gear, the rotary motion of the ring gear causes the engine crankshaft to rotate rapidly, allowing the engine to start.

Other examples of engine starters may include permanently engaged starter (PES) and integrated starter generators (ISG). In PES systems, the pinion gear is permanently meshed with the ring gear, during engine operation. When the pinion gear is permanently engaged with the ring gear for longer periods of time, increased gear wear and high duty cycles may lead to reduced gear lifespan. These systems may require additional sealed lubrication systems. Further, use of high gear ratios (e.g., 10-15:1) between the pinion and ring gear, during engine startup may result in high speeds in the pinion gear which may be destructive. A power converter, typically placed between the engine and transmission, converts mechanical power of the engine into electrical energy when used in ISG systems. Alternatively, the power converter may convert vehicle electrical power into mechanical power. When functioning as an electric motor, the ISG system may be used to start the engine. The ISG system can also function as a generator, producing electric power (when the vehicle is operating), which may be used to power electric devices and charge a vehicle battery. Some ISG systems require high starting torque and may produce large vibrations during engine operation.

An example engine starter for a vehicle is disclosed by Haruno in U.S. Pat. No. 8,754,556. Therein, the engine starter includes a starter relay connected to a battery and a starter motor that is mechanically coupled to a clutch and a pinion gear via a drive shaft. The starter relay has a plunger that is connected to the drive shaft via a shift lever. During engine startup, an electric current from the battery passes through an electromagnetic coil within the starter relay to generate a force that actuates the plunger to move the shift lever. Forward movement of the shift lever shuttles the pinion gear to a meshing position with a ring gear coupled to an engine crankshaft.

However, in the embodiment of the engine starter disclosed above, the pinion gear may be engaged with the ring gear while the vehicle is at rest (i.e., crankshaft speed may be close to zero). Since the pinion gear has to be brought into alignment with the ring gear each time the engine is started, engine startup time may be increased causing unnecessary delays and reduction in fuel economy. Furthermore, backlash may occur when the pinion gear is engaged with the ring gear, causing driver discomfort.

The inventors herein have recognized the various issues discussed above, and developed an engine starter system to at least partially address the issues. In one example, an engine starter system may include a ring gear coupled to an engine crankshaft, and a pinion gear coupled to a starter motor, the pinion gear having centrifugally engaging elements (e.g., rocker elements) that selectively engage with the ring gear. In this way, the pinion gear may engage with the ring gear when the centrifugally engaging elements of the pinion gear rotate from a retracted position to an engaged position, to enable quick engine startup.

For example, the ring gear of the engine starter system may be permanently aligned with the pinion gear. When the engine is started, the rocker elements of the pinion gear may deploy from their pockets, allowing the pinion gear to engage with the ring gear and transmit torque to the engine crankshaft. After the engine has started, the pinion gear may be disengaged from the ring gear and the rocker elements may be rotated to the retracted position. In this way, the vehicle engine may be quickly started to improve fuel efficiency while reducing (e.g., minimizing) gear backlash and increasing the lifespan of gear components.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

FIGS. 3E and 3F show another example of a one-way clutch in a centrifugally engaging pinion gear having sprags.

DETAILED DESCRIPTION

Figure 1:
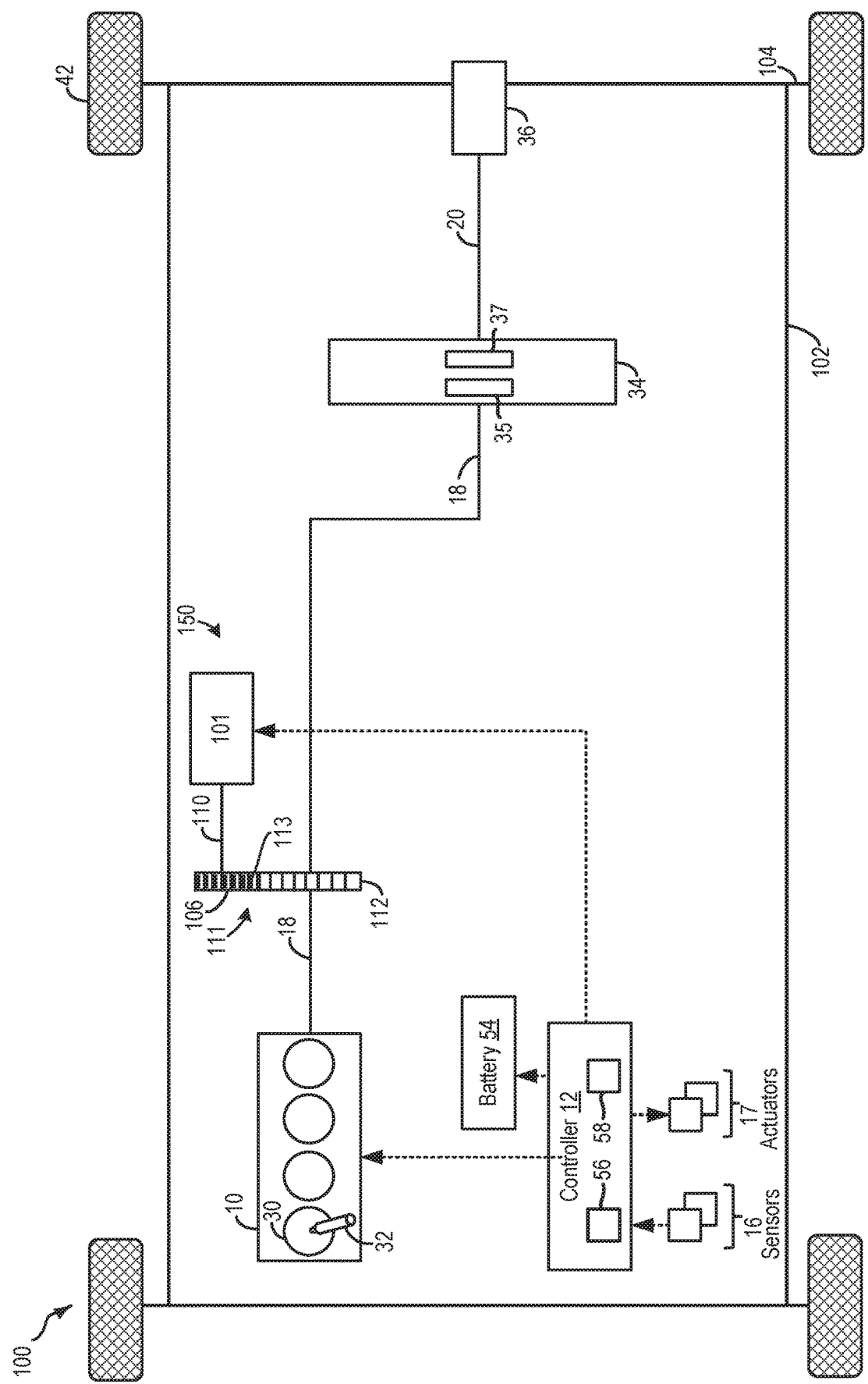
FIG. 1 shows a vehicle propulsion system with an engine including an engine starter, traction motor, and gear systems.
Figure 2:
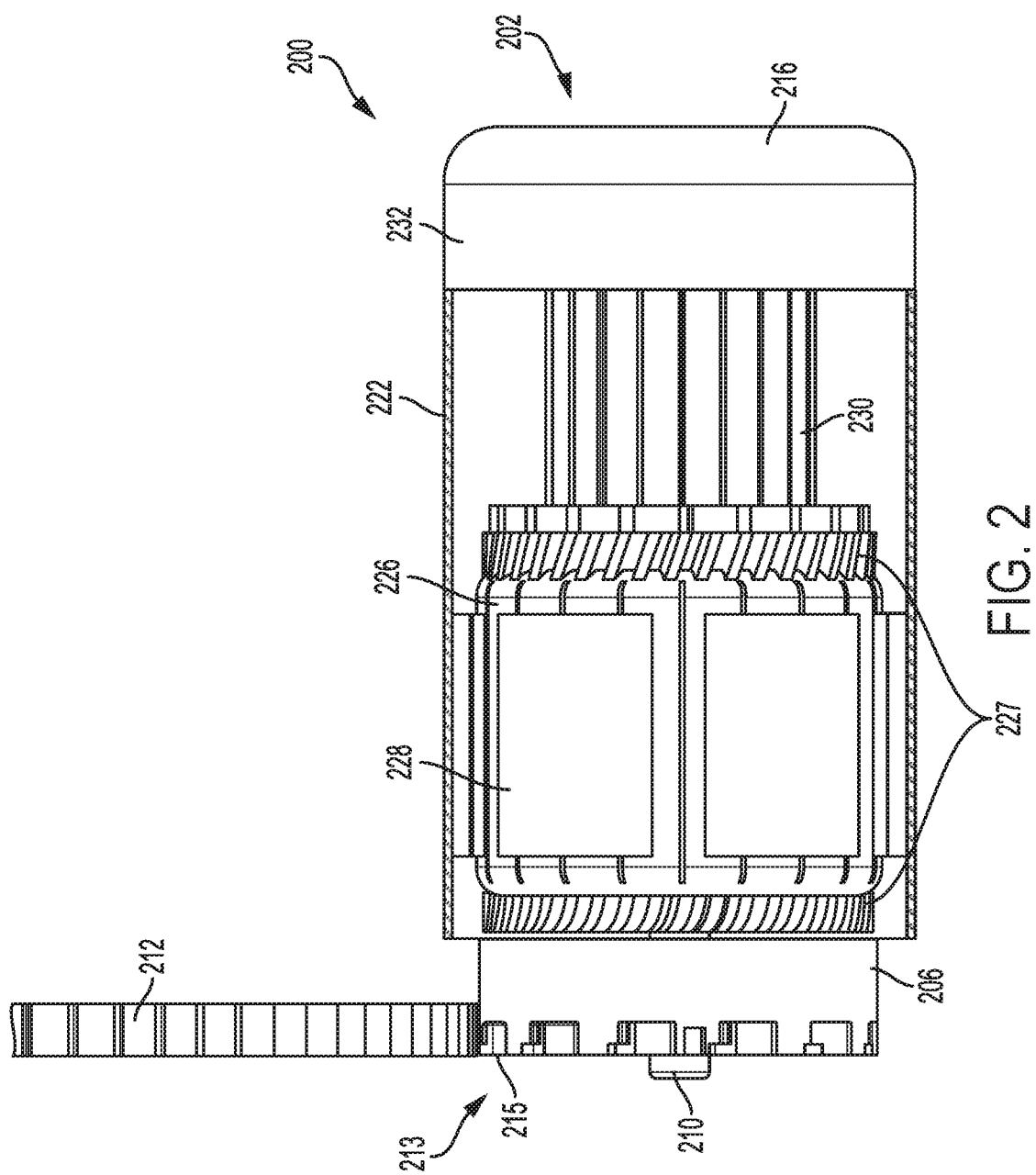
FIG. 2 shows an example of an engine starter system with the starter motor, pinion gear, and ring gear.
Figure 3A:
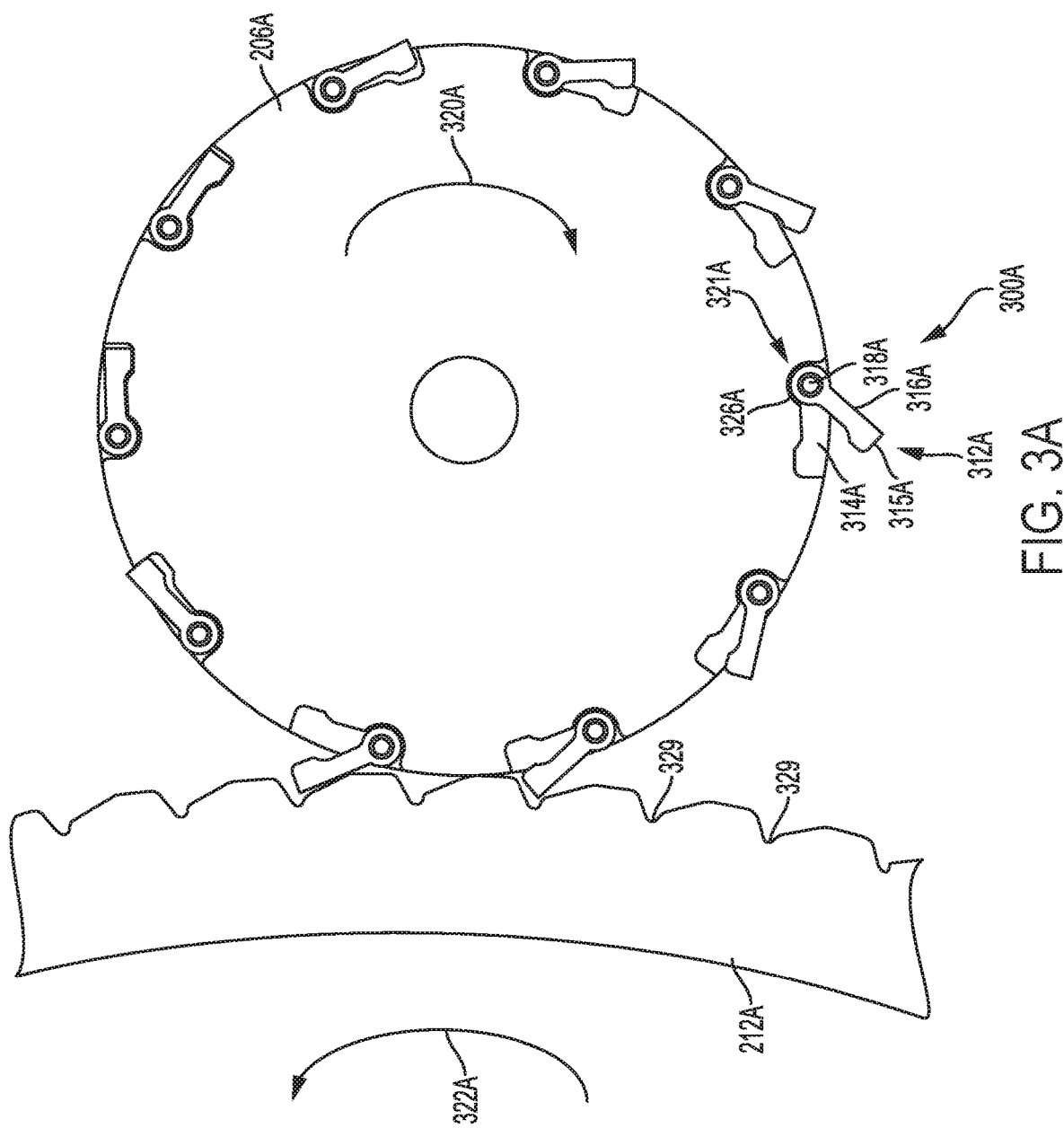
FIG. 3A shows an example of a clutch in a centrifugally engaging pinion gear with a one-way rocker clutch configuration.
Figure 3C:
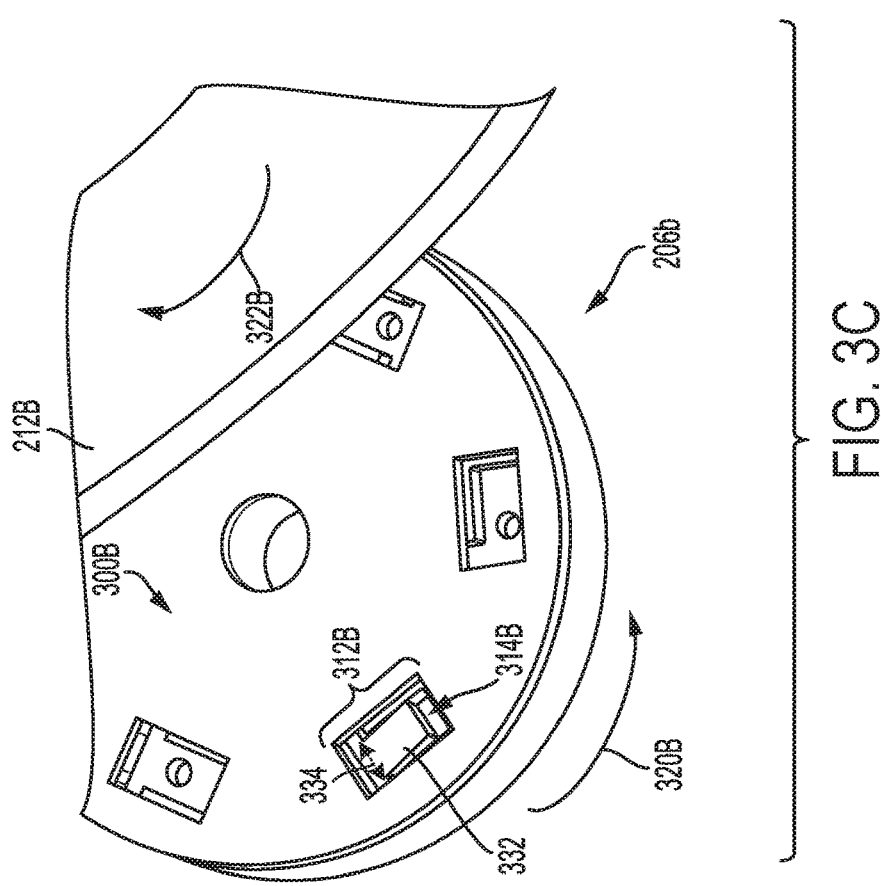
FIGS. 3B and 3C show another example of a one-way clutch in a centrifugally engaging pinion gear having mechanical diodes.
Figure 3B:
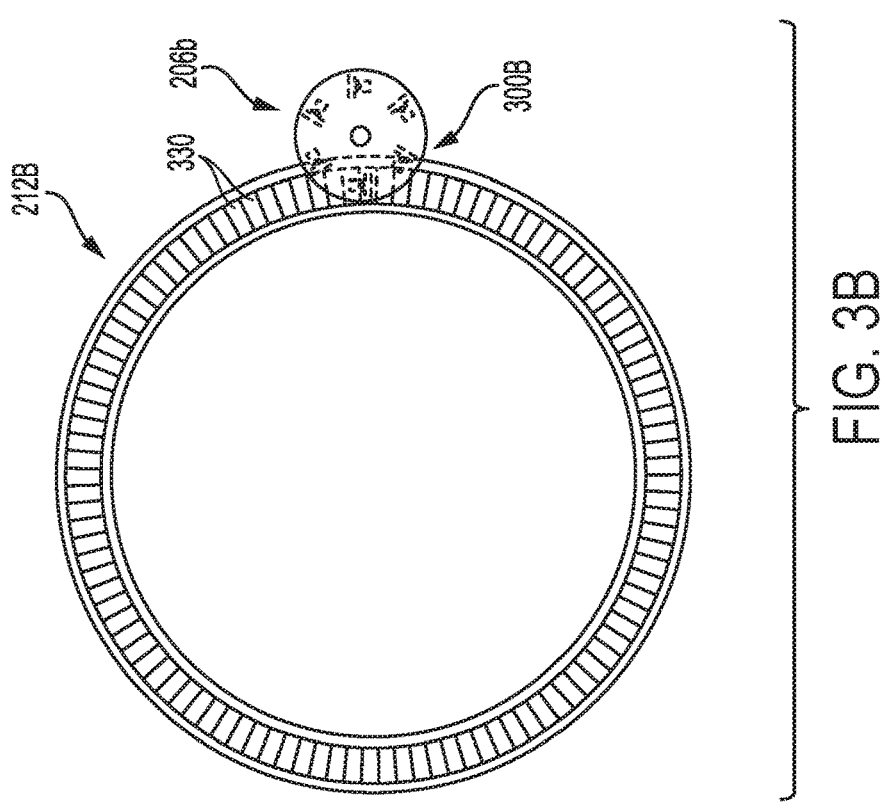
Figure 3D:
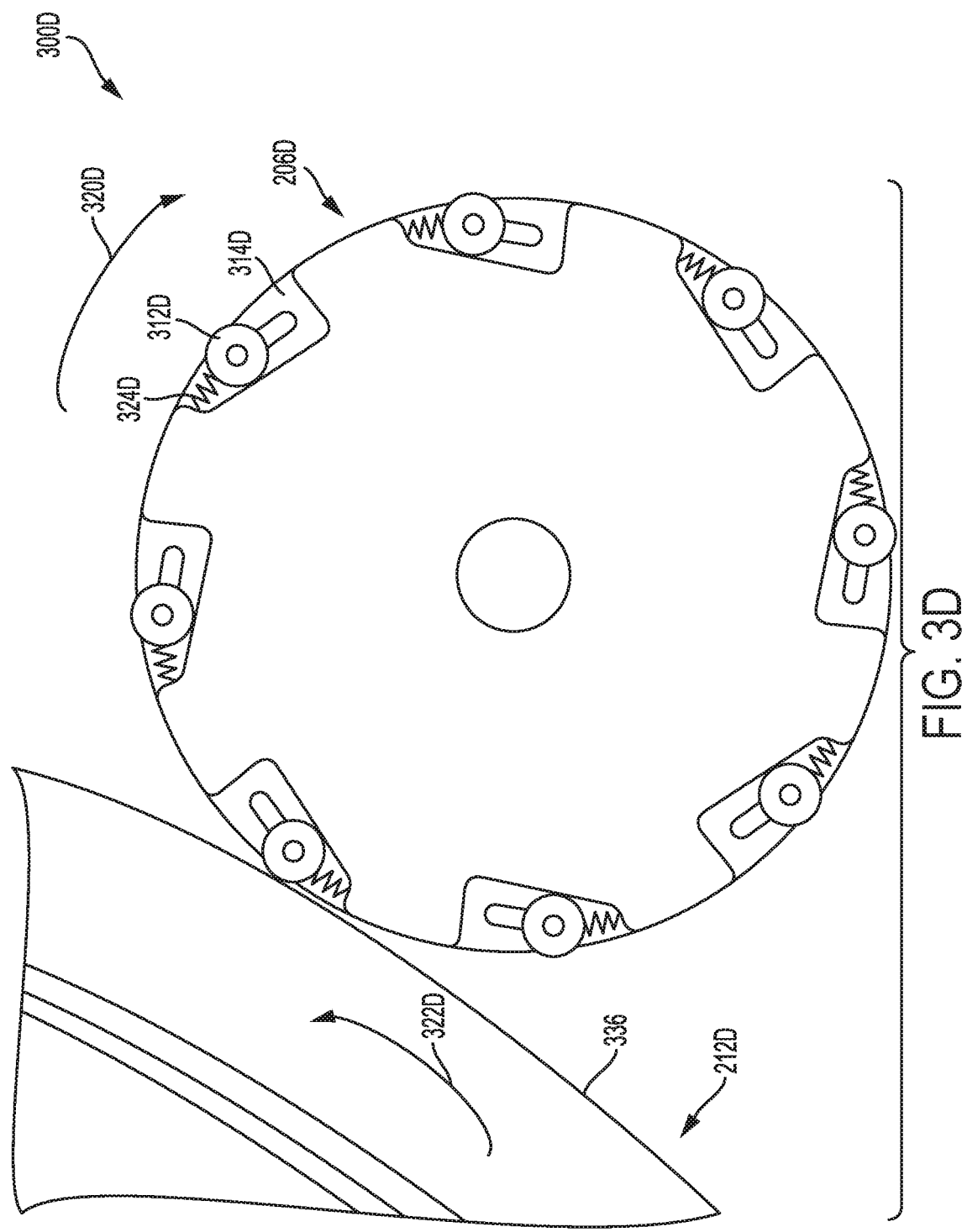
FIG. 3D shows another example of a one-way clutch in a centrifugally engaging pinion gear having roller engaging elements.
Figure 4B:
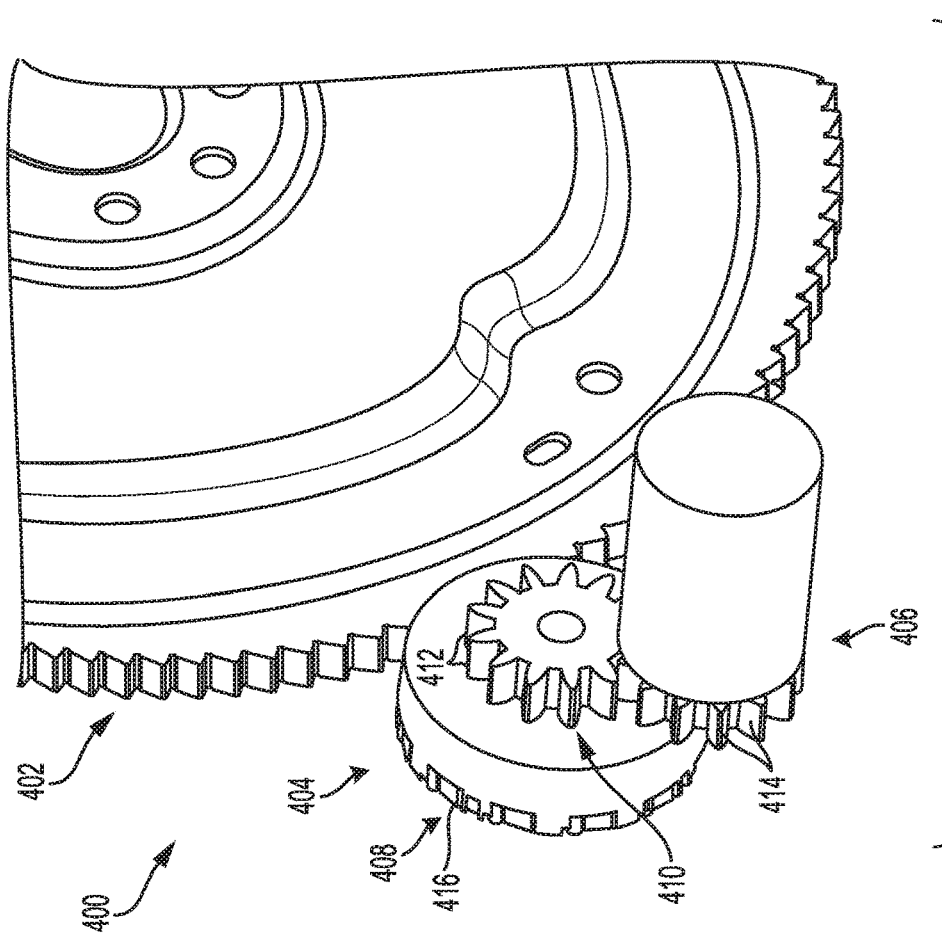
FIGS. 4A and 4B show an example of a centrifugally engaging pinion gear that is on a secondary axis from the starter.
Figure 4A:
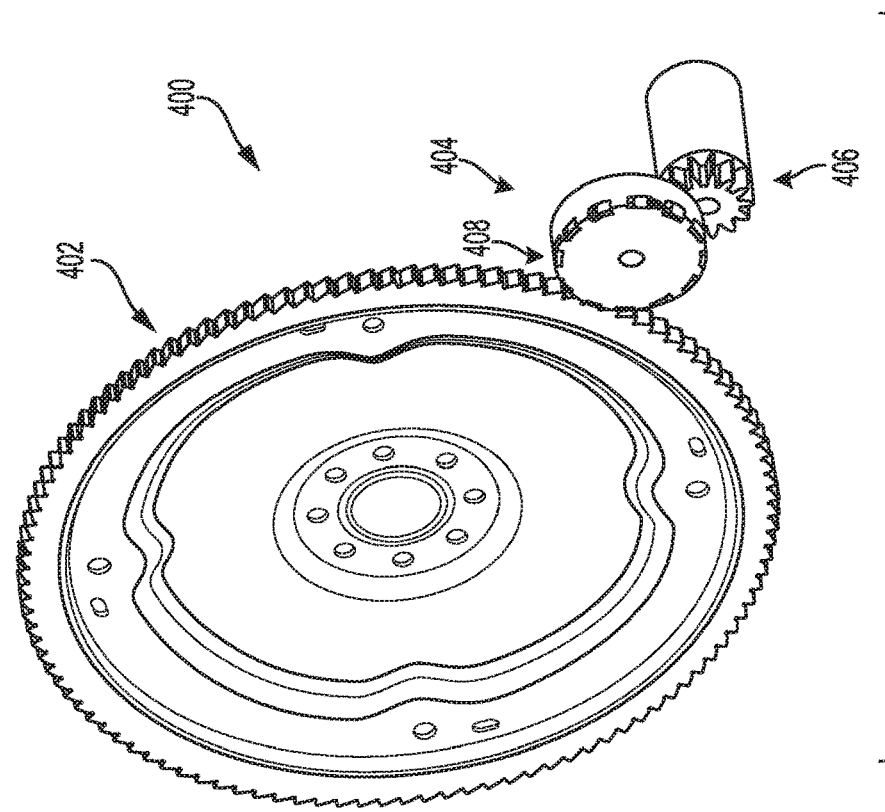
Figure 5:
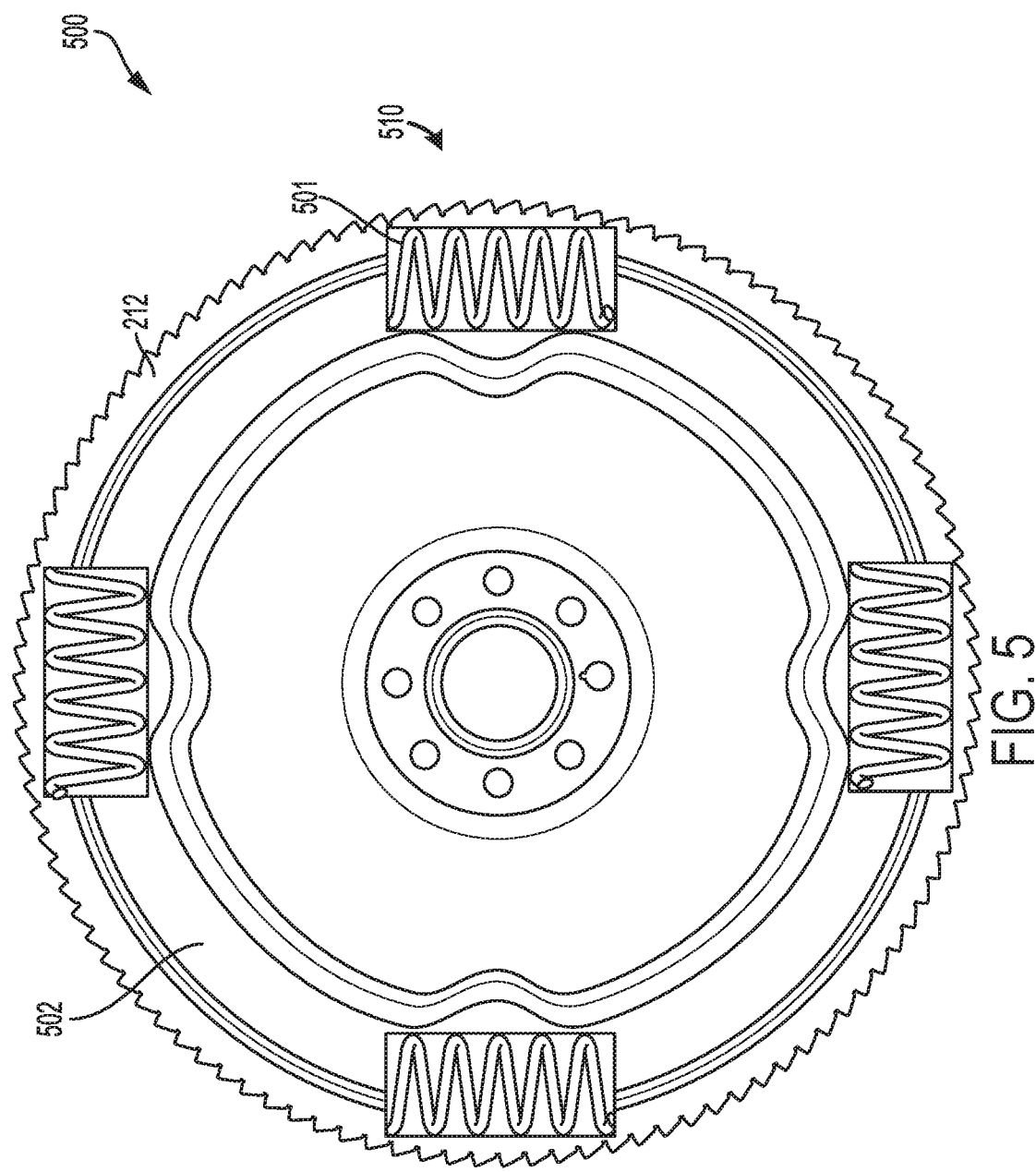
FIG. 5 shows an example of a spring damper system for the pinion gear and the ring gear.
Figure 6:
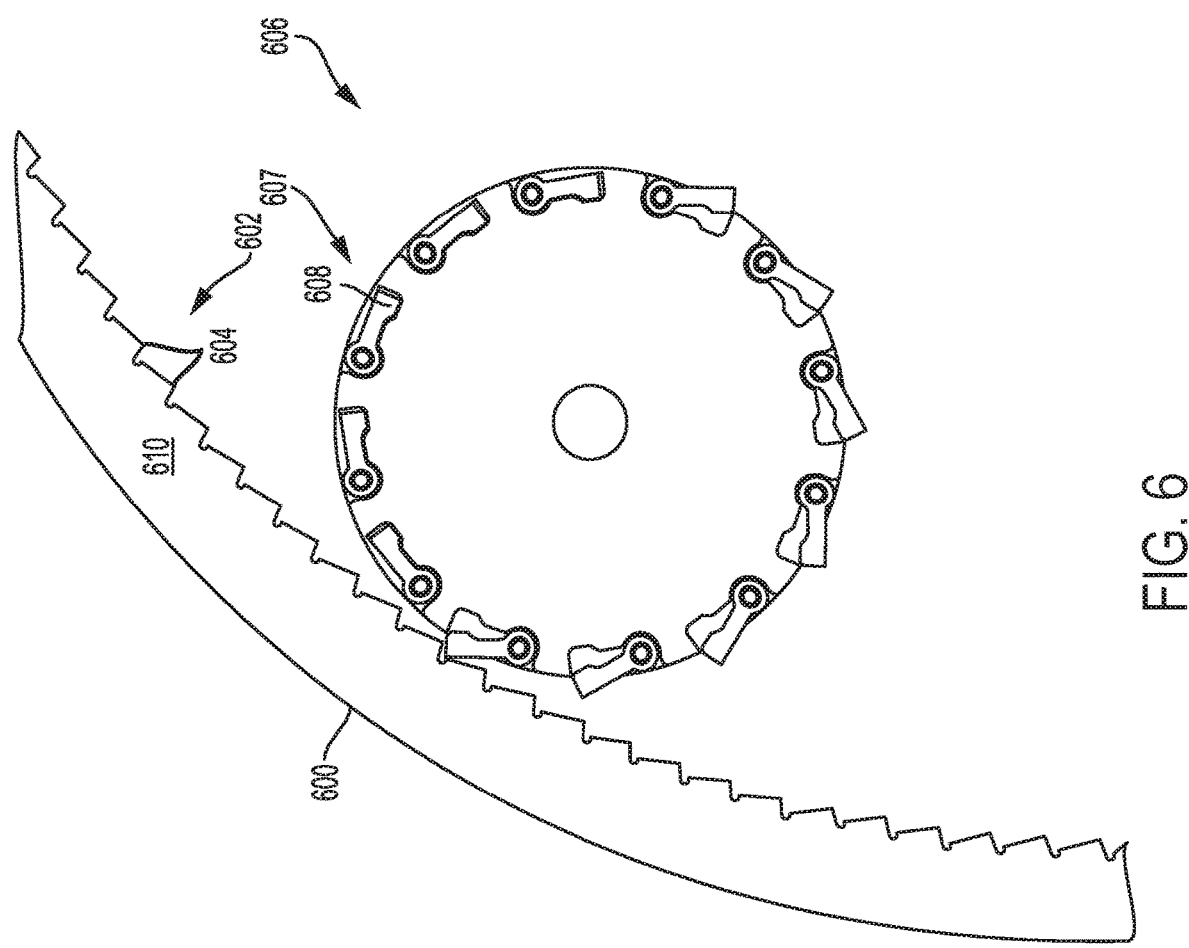
FIG. 6 shows an example of a centrifugally engaging pinion gear positioned along the inner diameter of the ring gear.
Figure 7:
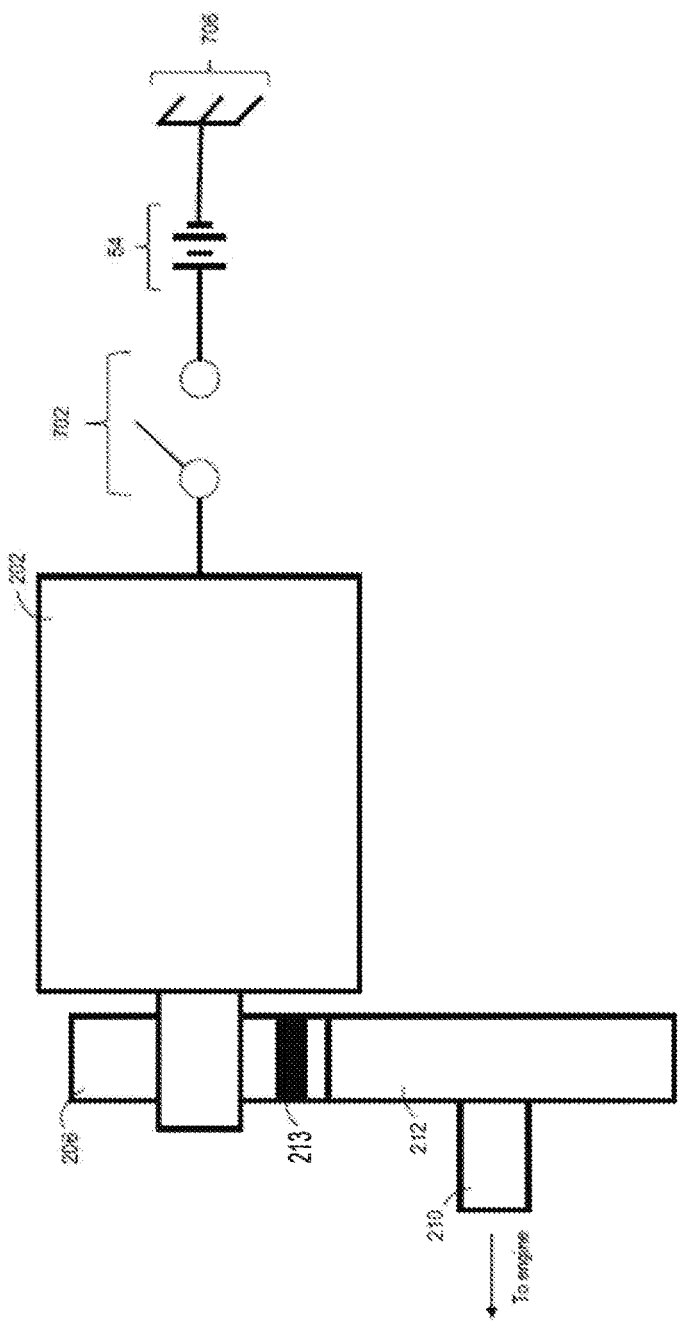
FIG. 7 shows an example of an electrical system for controlling the engine starter.
Figure 8:
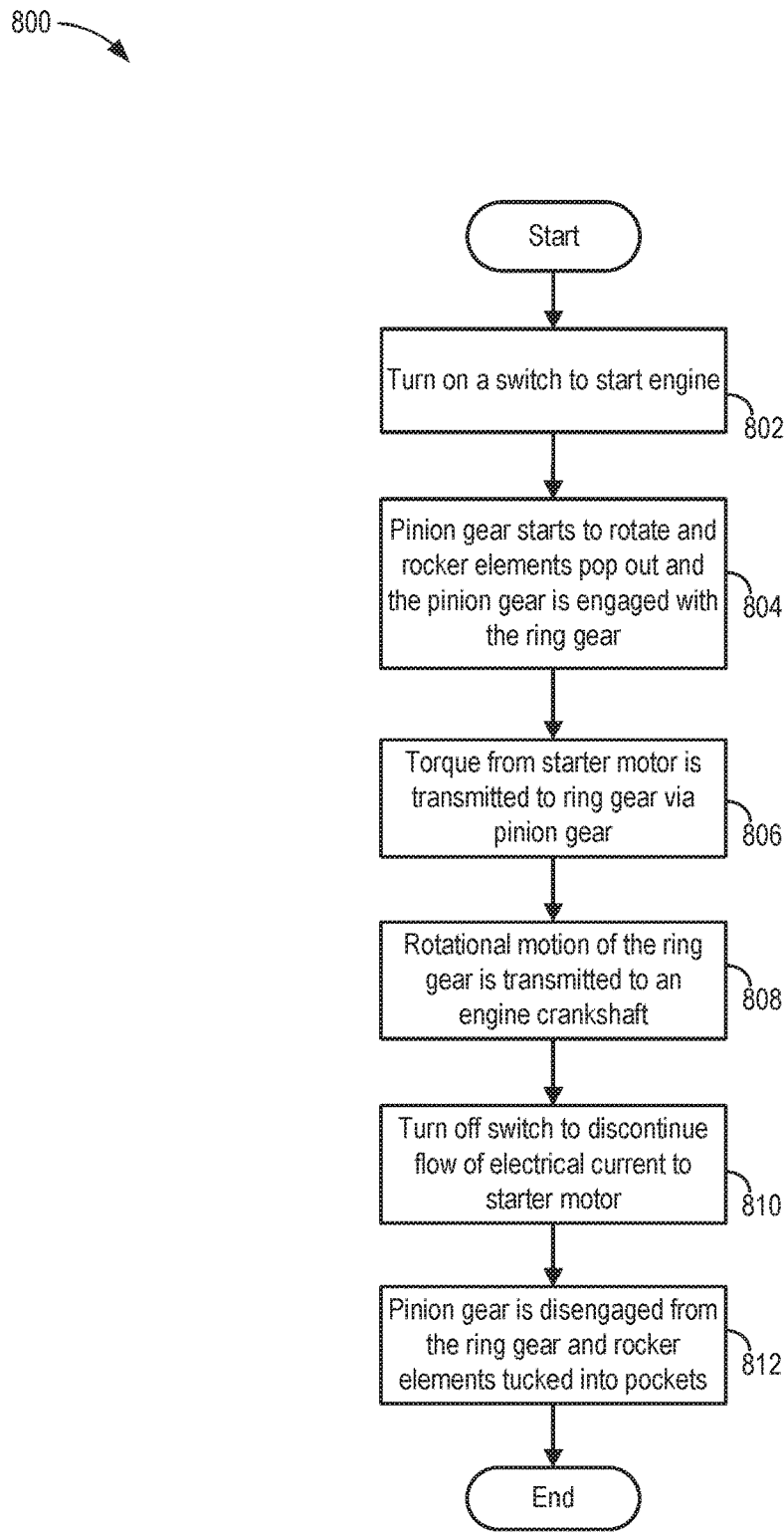
FIG. 8 shows an example method for starting the engine.
Figure 9:
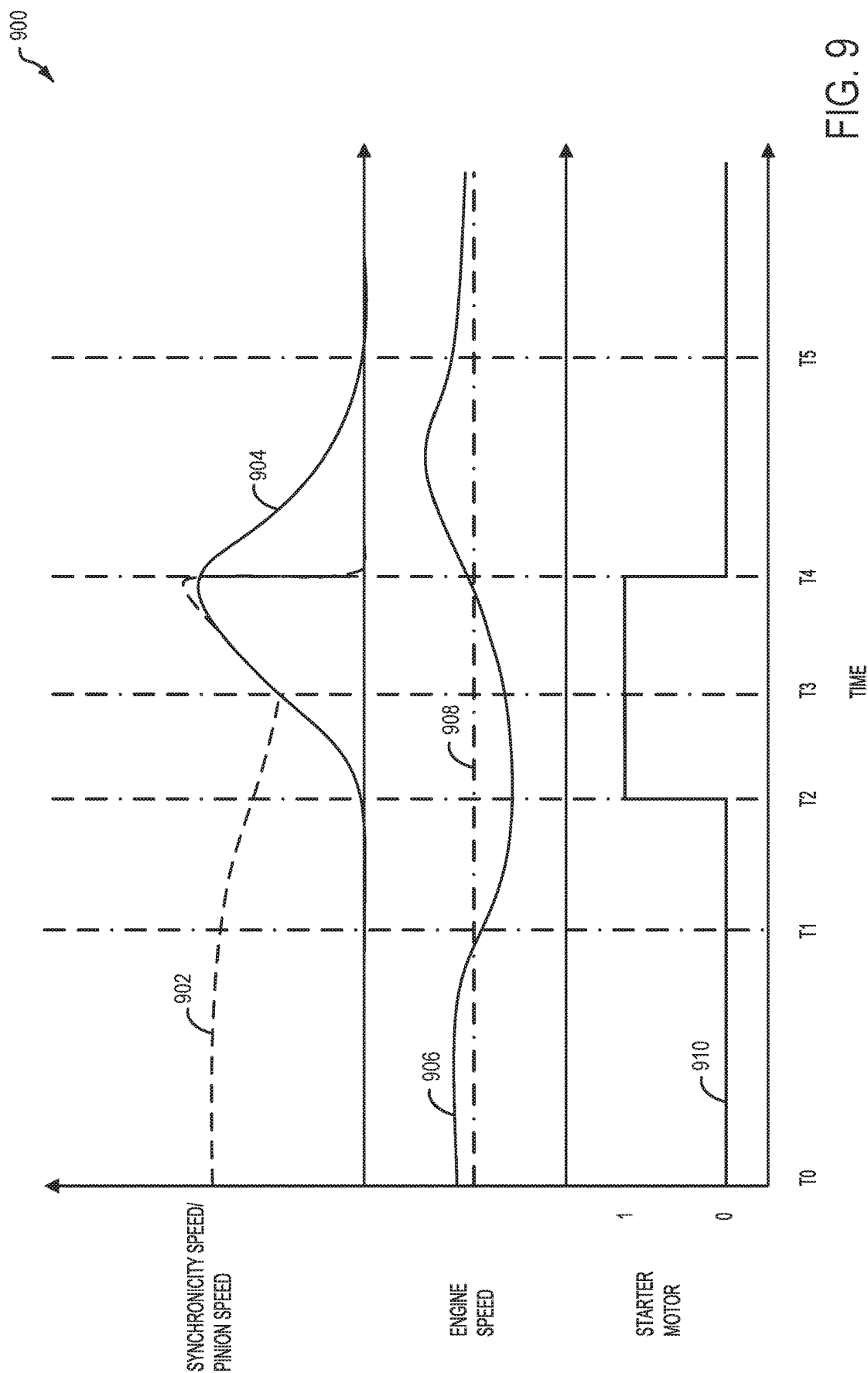
FIG. 9 shows an example graphic output when the engine starter of a vehicle propulsion system is operated to restart the engine.

The following description relates to systems and methods for starting a vehicle engine using an engine starter with a starter motor, a pinion gear (e.g., rocker pinion gear), and ring gear coupled to an engine crankshaft. A vehicle propulsion system with an engine starter, traction motor and gear systems is shown at FIG. 1. An example of an engine starter system is shown at FIG. 2. The engine starter includes a starter motor and pinion gear axially coupled to a drive shaft connected the starter motor via a clutch. The drive shaft allows the pinion gear to transmit torque from the starter motor to the ring gear that is further transmitted to the engine crankshaft. In this way, rotational motion of the output shaft allows the engine to start quickly. FIG. 3A shows an example of a gear system including a pinion gear with centrifugally engaging elements in the clutch, and a ring gear. In FIG. 3A the centrifugally engaging elements are rocker elements designed to pivot about a pin to extend and retract based on the speed of rotation of the pinion gear. Note that the centrifugally engaging elements can also be configured as mechanical diodes, as shown in FIGS. 3B and 3C, as rollers, as shown in FIG. 3D, and as sprags, as shown in FIGS. 3E and 3F. In one example, the rocker elements may be attached along the circumferential surface of the pinion gear, may be configured to pop out when the pinion gear is brought up to or above the rocker deployment speed which then allows the rocker to mesh with the ring gear. When the ring gear is brought up to speed such that it fires the engine the ring gear speed can exceed the pinion gear speed without driving it as the rocker function as a one-way clutch. Both gears are disengaged, thus the starting motor can be turned off. The rotation of the pinion gear stops and the rocker elements may be tucked into their respective pockets, to reduce (e.g., minimize) instances of the pinion gear engaging with the ring gear during vehicle operation. FIGS. 4A and 4B show an example configuration of a pinion gear that is on a secondary axis from the starter. Positioning the pinion gear on the secondary axis from the starter allows more variability in the sizes of the pinion gear, rockers, and starter, if desired. FIG. 5 shows an example spring damper system incorporated into the ring gear, which helps to mitigate clunk upon first impact. FIG. 6 shows an example of a different configuration, in which the pinion gear meshes with the cams on the inner diameter of the ring gear. FIG. 7 shows an example electrical system for controlling the engine starter. The electrical system includes a plurality of switches to control starter motor. FIG. 8 shows an example method for starting the engine with the engine starter including the starter motor, pinion gear and ring gear coupled to the engine via the crankshaft. The starter motor is connected to the electrical system that controls flow of electric current within the engine starter. FIG. 9, shows an example graphic output when the engine starter is operated to restart the engine. A synchronicity speed and pinion speed may be matched to ensure the pinion gear adequately engages with the ring gear when the engine is restarted. Controlling the starter motor's pinion gear speed may also be used to mitigate clunk and/or other noise, vibration, and harshness (NVH).

FIGS. 1-6 show example configurations with relative positioning of the various components of a vehicle propulsion system and an engine starter system. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example.

FIG. 1 depicts a vehicle propulsion system 100 including a vehicle chassis 102 and an axle 104 with wheels 42, and an engine 10, where the wheels may rest on the ground. As shown, the engine has a plurality of cylinders 30 that may be fueled from a fuel system (not shown) including one or more fuel tanks, a fuel pump, and fuel injectors 32. Engine 10 may be started by actuating an engine starter system 150 to generate a torque or rotational force. The engine starter system 150 includes a starter motor 101 generating torque which is transmitted via drive shaft 110 to pinion gear 106 (e.g., pinion gear pocket plate) with a clutch 111 having centrifugally engaging elements 113. The clutch 111 enables the pinion gear 106 to selectively engage with a ring gear 112.

The pinion gear may not be axially shiftable and may be always positioned at the same axial position throughout all operation, in one example. In another example, the centrifugally engaging elements may be attached to a circumferential surface of the pinion gear via rods or springs or set in pockets with a retainer plate, allowing the centrifugally engaging elements to deploy from a retracted position to an engaged position when the pinion gear is actuated. In one instance, this may be controlled by the center of gravity of a rocker and the engineered geometry of the rocker and pocket interface, in the clutch, resulting in controlled contact points between the rocker and the pocket. Once a starter motor of the engine starter is turned off, the centrifugally engaging elements are tucked into their respective pockets either by gravity and/or by springs, and the pinion gear cannot mesh with ring gear 112. When the starter motor of the engine starter is turned on, a torque generated by the starter motor is transmitted to the pinion gear causing the gear to rotate. As a result, a centrifugal force caused by rotation of the pinion gear causes the centrifugally engaging elements to rotate from their retracted position to the engaged position, allowing the pinion gear to engage with the ring gear.

When the pinion gear is brought into meshing contact with the ring gear, the torque generated by the starter motor is further transmitted to the ring gear, enabling engine crankshaft 18 to rotate rapidly to start the engine. For example, the pinion gear may be permanently aligned with the ring gear to allow quick engine restarting while the vehicle is in motion. When running, engine 10 delivers power to transmission system 34 that may include a clutch converter 35, plurality of gears 37, etc. The transmission system may modify the transmitted torque before delivering power to differential assembly 36 via output shaft 20. Subsequently, the differential assembly 36 distributes the transmitted power to vehicle wheels 42, allowing the vehicle to be propelled. Details of the engine starter are described in greater detail herein with regard to FIGS. 2 and 7.

The vehicle propulsion system 100 may further include a control system including controller 12 configured to receive information from a plurality of sensors 16 and sending control signals to a plurality of actuators 17. For example, the controller may receive information from the engine starter system 150 and battery 54. The controller may also receive information from sensors 16. As an example, sensors 16 may include various pressure and temperature sensors, a fuel level sensor, exhaust gas sensors, etc. The various actuators may include gears, cylinder fuel injectors (not shown), an air intake throttle coupled to the engine intake manifold (not shown), starter switch, etc. Controller 12 may receive input data from the engine starter and various sensors, process the input data, and trigger the actuators in response to the processed input data based on instruction or code programmed therein corresponding to one or more routines.

An example control routine for controlling the engine is described herein with reference to FIG. 8, and an example graphic output is disclosed at FIG. 9. Furthermore, the controller includes at least a processor 56 and memory 58 (e.g., non-transitory memory) storing instructions executable by the processor. The stored instructions may be any of the control routines, methods, etc., described herein.

Turning to FIG. 2, an example engine starter system 200 is shown with a starter motor 202, pinion gear 206 axially coupled to a drive shaft 210 connected the starter motor. It will be appreciated that the engine starter system 200 is an example configuration of the engine starter system 150, shown in FIG. 1. The pinion gear 206 (e.g., rocker pinion gear) is mechanically coupled to the drive shaft to allow the pinion gear to transmit torque from the starter motor 202 to ring gear 212 coupled to the crankshaft connected to the engine. The engine starter may be provided on a vehicle propulsion system, such as shown in FIG. 1, and may be adapted for use on vehicle systems of other configurations. It will be appreciated that the ring gear 212 may also be included in the engine starter system 200.

The pinion gear 206 may also include a clutch 213 having centrifugally engaging elements 215. The clutch 213 may be configured to transfer rotational energy from the pinion gear 206 to the ring gear 212 during desired operating conditions. Specifically, in one example, the clutch 213 may be configured as a one-way clutch that engages the ring gear 212 when the rotational speed of the pinion gear surpasses a threshold value. Different examples of the clutch 213 are described in greater detail herein with regard to FIGS. 3A-3F.

The starter motor 202 includes an armature core 226 firmly connected to motor shaft, armature coil 227 wound around the armature core and electromechanically connected to commutator 230. Poles 228 consisting of permanent magnets attached to an inner circumferential surface of motor housing 222, define an opening containing the armature core. Brushes 232 positioned at the rear end of the starter motor, are placed in sliding contact with the commutator 230. A distal end of the motor shaft is mounted inside end cap 216, which may contain lubricating oil that maintains temperature of the motor shaft at acceptable levels to enable smooth operation of the starter motor. It will be appreciated that other suitable starter motor configurations that generate output torque responsive to an input of electrical energy, have been contemplated. For instance, the starter motor may have a brushless configuration, in other examples.

FIGS. 3A-3F show different examples of the clutch 213 with the centrifugally engaging elements 215 in the pinion gear 206, shown in FIG. 2. As such, the clutches shown in FIGS. 3A-3F are examples of the clutch 213 and therefore may be included in the engine starter system 200, shown in FIG. 2.

Referring now to FIG. 3A, the pinion gear 206a is shown in meshing contact with the ring gear 212a. A clutch 300a integrated into the pinion gear 206a and providing one-way rotational engagement between the pinion gear 206a and the ring gear 212a, is also shown in FIG. 3A. In FIG. 3A, the clutch 300a is in the engaged configuration (e.g., providing meshing contact between the pinion gear 206a and the ring gear 212a). However, during different operating conditions the clutch may be in a disengaged configuration where meshing contact between the pinion gear 206a and the ring gear 212a is not occurring. When the clutch 300a is in the engaged configuration the ring gear 212a rotates in direction 322a in response to receiving rotational input from the pinion gear 206a rotating in direction 320a.

As shown in FIG. 3A, the clutch 300a has pockets 314a and rotatable rocker elements 312a retained radially via a pin 318a and retained axially via retainer plate 326a to a circumferential surface of the pinion gear. Pocket 314a is sized to fit the rocker element 312a when in a retracted position. As shown, the rotatable rocker elements 312a have an engaging end 315a of a rocker arm 316a that swings out when moved, and the pocket 314a underneath the rocker arm that allows the rocker arm when retracted to fit completely into the pocket. Furthermore, the rotatable rocker element has a round rotating end 321a. The rotating end 321a may include an opening for a retaining rod that radially retains the rocker element to the pinion gear, in one example. However, in other examples, the opening may be omitted from the rotating end 321a. It will be appreciated that the engaging end 315a may be configured to mesh with notches 329 in the ring gear 212a when the clutch 300a is in an engaged configuration.

Another configuration for a clutch 300b is shown in FIGS. 3B and 3C. Specifically, FIG. 3B shows a view of the ring gear 212b and the clutch 300b in the pinion gear 206b. As shown in FIG. 3B, the ring gear 212b includes notches 330. However, in other examples the ring gear 212b may include cams. The notches 330 may be configured to engage with components in the clutch 300b, discussed in greater detail with regard to FIG. 3C.

FIG. 3C shows a detailed view of a portion of the ring gear 212b and the clutch 300b in the pinion gear 206b. The clutch 300b has a configuration including mechanical diodes 312b that sit in pockets 314b on the face of the pinion gear and deploy axially to engage the 330 notches, shown in FIG. 3B, during desired operating conditions. Specifically, the mechanical diodes 312b include arms 332 that engage with the notches 330, shown in FIG. 3B. The arms 332 may pivot about an axis 334 to enable the arm to travel into the engaged and disengaged position.

When rotating in direction 320b the mechanical diodes 312b deploy once the pinion gear reaches its deployment speed. The deployed mechanical diodes 312b may then couple with the notches 330, shown in FIG. 3B, on the overlapping face of the ring gear 212b thus rotating the ring gear in direction 322b. FIG. 3C shows the ring gear 212b rotating in direction 322b and the pinion gear 206b rotating in direction 320b.

Another configuration for a clutch 300d in the engine starter system is shown in FIG. 3D. FIG. 3D shows the ring gear 212d rotating in direction 322d and the pinion gear 206d rotating in direction 320d. In the illustrated example, the clutch 300d is a roller one-way clutch.

In the clutch configuration shown in FIG. 3D the clutch 300d includes rollers 312d sitting in pockets 314d radially positioned around the pinion gear 206d.

Springs 324d may be used to return the rollers 312d to a non-deployment position when the part is at rest or under the deployment speed. When the pinion gear is rotated at or above the deployment speed in direction 320d the rollers centrifugally slide up the pocket to where they may come into contact with the radially smooth ring gear 212d, causing it to rotate in direction 322d. For instance, an outer surface 336 may be smooth and form an annular shape to enable lower friction interaction between the ring gear 212d and the pinion gear 206d. However, other ring gear surface profiles have been contemplated, such as profiles with engagement recesses, for instance.

FIGS. 3E and 3F show another configuration of a clutch 300e in the engine starter system. Specifically, FIG. 3E illustrates a ring gear 212e rotating in direction 322e and a pinion gear 206e rotating in direction 320e. The clutch 300e is configured as a sprag one-way clutch in FIGS. 3E and 3F. Specifically, the clutch 300e includes sprags 342 connected by springs 344. The sprags 342 sit in a radial groove 346 in the pinion gear 206e.

The springs 344 may be used to return the sprags 342 to a non-deployment position when the part is at rest or under the deployment speed. When the pinion gear is rotated at or above the deployment speed in direction 320e the sprags 342 centrifugally slide up the groove to where they may come into contact with the radially smooth ring gear 212e, causing it to rotate in direction 322e.

FIG. 3F shows a detailed view of the sprags 342 and springs 344 in the clutch 300e. A section of the ring gear 212e and the pinion gear 206e are also shown in FIG. 3F. The sprags 342 are asymmetric and have a figure-8 shape, in the illustrated example. Specifically, the sprags 342 includes an outer surface 348 with engaging lobes 350 that may be in face sharing contact with an outer surface 354 of the ring gear 212e and/or an outer surface 356 of the pinion gear 206e, when the clutch 300e is in an engaged configuration. In this way, rotational energy from the pinion gear may be transferred to the ring gear from the pinion gear. In a disengaged configuration, the lobes 350 in the sprags 348 may be spaced away from the outer surface 354 of the ring gear 212e and/or the outer surface 356 of the pinion gear 206e. The sprags 342 also include non-engaging lobes 352. The non-engaging lobes 352 are not in face sharing contact with the ring and pinion gears in both the engaged and disengaged configuration. Additionally, the non-engaging lobes 352 are positioned on corners of the sprags 342. The springs 344 may be coupled to the sprags 342 adjacent to the non-engaging lobes 352.

Another configuration for a pinion gear is shown in FIGS. 4A and 4B where the pinion gear is positioned on a secondary axis. The engine starter system 400 shown in FIGS. 4A and 4B is an example of the engine starter system 150, shown in FIG. 1. Specifically, FIG. 4A shows a front view of the engine starter system 400 and FIG. 4B shows a rear view of the engine starter system 400. The engine starter system 400 includes a ring gear 402 and a starter pinion gear 404 meshed to a secondary axis pinion gear 406. The starter pinion gear 404 includes a clutch 408. The clutch 408 may be designed with the clutch features or combinations of the features discussed above with regard to FIGS. 3A-3F. For instance, the clutch may be a one-way clutch with rocker arms or mechanical diodes.

As shown in FIG. 4B, the secondary axis pinion gear 406 may be rotationally coupled to the pinion gear 404 via an attachment gear 410 having teeth 412 meshing with teeth 414 in the secondary axis pinion gear 406. Thus, the starter pinion gear 402 may be meshed to the secondary axis pinion gear 404 that is fixed to the pinion gear 402. Thus, the starter pinion gear 402 may be meshed to the secondary axis pinion gear 404 that is fixed to the pinion gear 402. In this configuration the pinion gear 206 and centrifugally engaging elements 416 in the clutch 408 can vary in size while still utilizing a smaller starter.

For packaging purposes there are more variations of configurations that would achieve the function of utilizing a centrifugally engaging pinion gear. For instance, the ring gear 600 can be designed with a skirt 602 which has cams 604 on a cam plate 610 on the inner diameter rather than the outer diameter, as shown in FIG. 6. In the configuration, shown in FIG. 6, the pinion gear 606 would be position co-axially on the inner diameter of the ring gear so that the centrifugally engaging elements 608 of the clutch 607 react on the cams that are on the inner diameter of the ring gear skirt. It will be appreciated that the clutch 607 in the pinion gear 606 may have a similar configuration to the clutch 300a, shown in FIG. 3A.

In one example, the centrifugally engaging pinion gear starter, described herein, may be designed and configured in such a way that would not require a lubrication system, if desired. This may be achieved by engineering the geometry of the rocker and pocket to reduce contact wear and also may or may not include of the use of springs so that there is reduced (e.g., minimal, substantially zero, etc.) ratcheting when the ring gear is overrunning the pinion gear. Another important aspect to address in order to omit a lubrication system is the rotatable rocker elements and/or the pinion gear pockets may include of non-corrosive/corrosive resistant materials. Examples of corrosion resistant materials but not limited to stainless steel, aluminum, titanium, nitrided carbon or alloy steel. This is so that the rocker and pocket do not seize together by corrosion.

In order to reduce (e.g., minimize) gear backlash, the starter motor may be dynamically controlled to match crankshaft speed when the pinion gear is brought into meshing contact with the ring gear. In this way, crankshaft speed may remain above 1000 rpm for example, when the vehicle is in motion. The pinion gear, typically with a lighter mass compared to the ring gear, may rotate at a different speed compared to the ring gear causing a difference in inertia between the pair of gears. As shown in FIG. 5, a damper 510 may be attached to the gear system to mitigate the difference in inertia between the pinion gear and ring gear during gear engagement. There are multiple ways to achieve the dampening effect, an example of the ring gear damper system 500 may be but not limited to the use of springs 501, elastomers, etc., to separate the ring gear 212 from flywheel 502. The damper could also be incorporated into the starter motor. The damper may reduce (e.g., eliminate) a clunk or gear backlash when the pinion gear rocker elements engage the ring gear and also reduce the impact on the hardware, thereby reducing wear on the system.

Another method to mitigate backlash and reduce clunk is to have two rocker elements in mesh with the ring gear at any time after the pinion gear is spun up to the deployment speed. This method may utilize gravity, the rocker element's center of gravity, and the position of the pinion such that at least 2 of the rocker elements are in mesh with the ring gear when deployment is requested, and when the pinion gear is at rest those rockers that are radially in position to mesh with the ring gear would retract back into their pockets such that they are not in contact with the ring gear. However, elsewhere radially around the pinion gear rockers may be in the deployed position due to gravity but are not in contact with the ring gear.

Upon meshing, the pinion gear may transmit the torque generated from the starter motor to the ring gear, causing the ring gear to rotate in a direction, and subsequently transmit the torque to the crankshaft. As a result, the crankshaft rotates rapidly to start the engine. In this way, the pinion gear may be brought into meshing contact with the permanently aligned ring gear to allow quick engine start, while reducing (e.g., minimizing) clunk or gear backlash.

Turning now to FIG. 7, an example electrical system 700 is shown for controlling the engine starter, such as engine starter system 150 disclosed with reference to FIG. 1. The electrical system 700 includes a switch 702 connected to the battery 54.

As shown, starter motor 202 is electrically connected to the battery 54, with distal end 706 of the battery being grounded. A controller (e.g., controller 12 at FIG. 1) may be actuated to close the switch 702 after the engine starter is turned on. When the switch 702 is closed, the electrical system 700 forms a closed circuit allowing electrical current to flow from the battery to the starter motor 202. The switch does not control the position of the pinion gear, since the pinion gear may be permanently aligned with the ring gear before the engine is started and during engine operation. For example, the pinion gear may not be axially shiftable and may be always positioned at the same axial position throughout all engine operation. In another example, the ring gear is not axially movable during starting operation, engine operation, and engine deactivation.

Centrifugally engaging elements 213 attached to an outer surface of the pinion gear may remain in their tucked in positions until prior to gear engagement. Once the starter motor 202 is electrically connected to the battery 54, an electrical current flows through an armature core in starter motor 202, generating a torque or rotational force that is transmitted to drive shaft 210 of the ring gear 212. The torque generated by the starter motor is transmitted to pinion gear 206 which may rotate in a first direction. The rotary motion of the pinion gear produces a centrifugal force that causes the centrifugally engaging elements 113 to pop out of their respective pockets, allowing the pinion gear to mesh with the ring gear. When brought into meshing contact with the ring gear, the pinion gear transmits the torque from the starter motor to the ring gear coupled to the engine crankshaft, causing the ring gear to rotate in a second direction, opposite to the first direction. The rotary motion of the ring gear causes the engine crankshaft to rotate rapidly, allowing the engine to start.

After disengaging from the ring gear, the rocker elements on the pinion gear may be tucked into their respective pockets, and the pinion gear may not mesh with the ring gear once the engine has started. In one example, the rotatable rocker elements have a retracted position in which they do not engage the ring gear, and an extended position in which they are engaged with the ring gear. As another example, the rocker elements may operate as a one-way clutch so that the ring gear cannot drive the pinion gear. In this way, gear engagement may be controlled by the position of the rocker elements. By disengaging the pinion gear from the ring gear, gear wear and duty cycles may be reduced to increase the gear lifespan.

In this way, the engine may be started by an engine starter system that includes the ring gear coupled to the engine crankshaft and the pinion gear coupled to the starter motor, the pinion gear having rotatable rocker elements for engaging the ring gear. Once in a pop out position, the rocker elements allow the pinion gear to engage with the ring gear, and transmit torque from the starter motor to the engine crankshaft, allowing the engine to start. Referring now to FIG. 8, an example method 800 is shown for starting a vehicle engine with an engine starter comprising a starter relay, a starter motor, and a pinion gear brought into meshing contact with a ring gear coupled to an engine crankshaft. In order to reduce (e.g., minimize) gear backlash, the starter motor may be dynamically controlled to match crankshaft speed when the pinion gear is brought into meshing contact with the ring gear. Instructions for carrying out method 800 included herein may be executed by a controller based on instructions stored in memory (e.g., non-transitory memory) of the controller and in conjunction with signals received from sensors of the engine system, such as the sensors described above with reference to FIG. 1. The controller may employ engine actuators of the engine system to adjust engine operation, according to the methods described below.

At 802, method 800 includes turning on a switch (such as switch 702 at FIG. 7) to start the engine. A controller (e.g., controller 12 at FIG. 1) may be actuated to turn on the switch to complete an electrical circuit connecting the starter relay to a battery or other suitable power source. In a first example of the engine starter, the first switch may not control a position of the pinion gear, since the pinion gear is permanently aligned with the ring gear before the engine is started and during engine operation. In one example, the controller may be actuated to turn on a switch to move a movable contact towards a stationary contact to connect the starter motor to the battery. Specifically, the movable contact is brought into face contact with the stationary contact to connect the starter motor with the battery. When electrically connected to the battery, an electrical current flows through an armature core (e.g., armature core 226 at FIG. 2) of the starter motor, generating changes in electromagnetic field in the core. As a result, the starter motor generates a torque or rotational force that is transmitted to the pinion gear via a drive shaft.

At 804, the pinion gear starts to rotate due to the torque generated in the starter motor. Rocker elements (e.g., rocker elements 312a at FIG. 3A) attached to a circumferential surface of the pinion gear may rotate from a retracted position to an engaged position due to the centrifugal force caused by gear rotation. Once the rocker elements are in engaged position, the rockers of pinion gear mesh with the cams of ring gear, as disclosed with reference to FIG. 3A. For example, teeth and rockers of the pinion gear may be moving at the same velocity as teeth of the ring gear, allowing the pinion gear to engage with the ring gear. In another example, the rotatable rocker elements may rotate from the retracted to the engaged position in a direction that is opposite to a rotating direction of the ring gear when the engine is running. The starter motor may be dynamically controlled to match a crankshaft speed when engaging the pinion gear to the ring gear while the vehicle is in motion as disclosed further with reference to FIG. 9. In this way, engine may be restarted while the crankshaft speed is above 1000 rpm, for example, and gear backlash may be reduced. Once the rocker elements are in engaged position torque from starter motor is transmitted to ring gear via pinion gear at 806.

Next at 808, the rotational motion of the ring gear is transmitted to the engine crankshaft coupled to both the ring gear. As a result, the engine crankshaft rotates rapidly with the ring gear, allowing the engine to start. For example, a speed of the engine crankshaft may increase from a lower level to a higher level after the engine has started.

At 810, the switch is turned off to discontinue flow of electrical current to starter motor. Next at 812, the pinion gear is disengaged from the ring gear and the rockers on the pinion gear are tucked into their respective pockets. For example, the pinion gear may remain aligned with the ring gear after disengagement while the engine is operating. Upon disengaging from the ring gear, the rockers on the pinion gear may be tucked into their respective pockets to reduce (e.g., minimize) instances of the pinion gear engaging with the ring gear once the engine has started. For example, the rocker elements or arms operate as a one-way clutch so that the ring gear cannot drive the pinion gear. In this way, gear lifespan may be increased by reducing gear wear and duty cycles during engine operation.

Referring now to FIG. 9, a graphic shows an example operation of an engine starter for starting a vehicle engine, such as the engine depicted in vehicle propulsion system 100 at FIG. 1. Vertical markers at times T0-T5 represent time of interest during the sequence. In all the plots discussed below, the horizontal axis represents time and time increases from the left side of each plot to the right side of each plot.

The first plot from top of FIG. 9 depicts synchronicity speed and pinion speed versus time. The vertical axis represents synchronicity speed and pinion speed, and the synchronicity speed and pinion speed increase in the direction of the vertical axis. Trace 902 represents the synchronicity speed, and trace 904 represents the pinion speed. The second plot from top of FIG. 9 depicts engine speed versus time. The vertical axis represents engine speed and the engine speed increases in the direction of the vertical axis. Trace 906 represents the engine speed, and trace 908 represents a threshold speed. The third plot from top of FIG. 9 depicts a starter motor condition versus time. The vertical axis represents the starter motor condition, a value of "0" indicates a first condition when the starter motor is turned off, and a value of "1" indicates a second condition when the starter motor is turned on. Trace 910 represents the starter motor condition.

At time between T0 and T1, the engine may be operating at engine speed (906) above a threshold speed (908), and the vehicle may be moving at a steady speed for example. The threshold speed is the minimum engine speed at which the engine can re-fire without assistance of the electric starter motor. Any time the engine speed is at or above the threshold speed and the electric starter motor is commanded the pinion rocker elements will overrun with respect to the ring gear. If the starter motor is commanded when the engine speed is below the threshold speed between T1 and T4 then the pinion rocker elements will be rotating faster than the ring gear, thus they will engage the ring gear until the engine speed reached the threshold speed. Once the threshold speed is achieve at T4 the ring gear will overrun the pinion gear and the starter motor may be turned off. In one example, a ring gear coupled to an engine crankshaft may be rotating at the engine speed, while disengaged from the pinion gear (i.e., ring gear teeth are not meshing with teeth of the pinion gear). The synchronicity speed (902) is fairly steady, and the pinion speed is zero since the starter motor (910) is turned off.

Prior to T1, the engine speed drops below the threshold speed due the vehicle slowing down, for example. In one example, the vehicle may be slowing down when approaching a road intersection with a stop light. The starter motor remains turned off, and the pinion gear remains at rest. As an example, rocker elements on the pinion gear may remain in a retracted position, and the pinion gear may not engage with the ring gear.

Between T1 and T2, the engine speed continues decreasing (until the vehicle slows down to a halt), but remains below the threshold speed. As an example, the engine speed decreases until the engine is turned off, but continues to rotate (i.e., engine speed is remains above zero speed). Similarly, the synchronicity speed decreases with the decreasing engine speed. The pinion speed remains zero since the starter motor is turned off.

At T2, the starter motor is turned on to restart the engine, after the vehicle has come to a complete stop, while the engine is still rotating. As an example, the restart request occurs before the engine spins to rest. As a result, the pinion gear speed (904) begins to increase gradually, but remains below the synchronicity speed. As an example, the rocker elements on the pinion gear may begin spinning, and speed of the rocker elements may increase gradually with increase in the pinion gear speed.

Between T2 and T3, the engine speed remains fairly steady, while the pinion gear speed increases gradually. The starter motor remains turned on to provide power to the pinion gear. The synchronicity speed continues to decreases, while remaining above the pinion gear speed.

At T3, the synchronicity speed reaches a value equal to the pinion gear speed. At this point, rotatable rocker elements of the pinion gear pop out of their pockets, and the pinion gear is engaged with the ring gear to transfer torque from the starter motor to the engine crankshaft. As an example, the rotatable rocker elements on the pinion gear may pop out of their pockets (due to a centrifugal force caused by gear rotation), allowing the pinion gear to mesh with the ring gear. In another example, the rotatable rocker elements may rotate from the retracted to the engaged position in a direction that is opposite to a rotating direction of the ring gear when the engine is running. In one example, teeth and rotatable rocker elements of the pinion gear may be moving at the same velocity as teeth of the ring gear, allowing the pinion gear to engage with the ring gear. When engaged with the pinion gear, speed of the ring gear may increase quickly allowing the engine crankshaft to rotate at the same speed as the ring gear. As an example, rotational revolutions of the starter motor may be adjusted responsive to a sensed engine speed. Consequently, the torque transferred (from the starter motor) may cause the engine crankshaft to rotate rapidly allowing the engine to quickly restart.

Between T3 and T4, the synchronicity speed and pinion gear speed increase rapidly, and consequently, the engine speed increases until the engine has restarted. Since the pinion gear is typically smaller in diameter compared to the ring gear, the pinion gear may rotate at a faster speed compared to the ring gear. Once the engine has restarted, engine cylinders may be fired to combust air and fuel, in order to provide engine torque to sustain vehicle propulsion. As a result, the vehicle may begin moving, and vehicle speed may increase. The starter motor remains turned on to provide power to the engine.

Prior to T4, the engine speed reaches the threshold speed, allowing the vehicle to move at a faster speed than at engine restart. The synchronicity speed increases at faster rate (compared to the pinion gear speed), and subsequently exceeds the pinion speed. As a result, the pinion gear is disengaged from the ring gear. For example, upon disengaging from the ring gear, the velocity of the rocker elements may decrease. In one example, the rocker elements may be retracted into their pockets once the velocity of the rocker elements decreases below a threshold velocity. In this way, the pinion gear may not engage with the ring gear after the engine has been restarted. As an example, the rocker elements or arms operate as a one-way clutch so that the ring gear cannot drive the pinion gear. By disengaging the pinion gear from the ring gear after the engine has restarted, gear wear may be reduced or minimized to increase gear lifespan.

At T4, the engine speed exceeds the threshold speed, and the vehicle speed may continue increasing. The starter motor may be turned off to discontinue delivery of power to the pinion gear. For example, the starter motor may be deactivated responsive to the engine speed reaching the threshold speed. Consequently, the synchronicity speed decreases to zero, and the pinion gear speed may begin decreasing gradually.

Between T4 and T5, the engine speed continues to increase until it reaches a peak engine speed before decreasing gradually. For example, the vehicle speed may increase rapidly with increase in engine speed before attaining a steady vehicle speed. The pinion speed continues to decrease rapidly, and the starter motor remains turned off.

At T5, the pinion gear speed reaches zero speed, and the pinion gear comes to rest. For example, the pinion gear may be spun down to rest after ring gear tooth velocity exceeds speed of the rocker elements or arms. The engine speed remains fairly steady, and the starter motor remains turned off.

The subject matter of the present disclosure is further described in the following paragraphs. According to one aspect, an engine starter system is provided. The engine starter system comprises a ring gear coupled to an engine crankshaft; and a pinion gear coupled to a starter motor, the pinion gear having centrifugally engaging elements for engaging the ring gear.

In another aspect, a method is provided. The method comprises during engine spinning down toward rest, responsive to a re-start request, spinning an axially and radially fixed pinion gear with a starter motor; displacing centrifugally engaging elements of the pinion gear toward a ring gear with teeth, the teeth moving faster than the centrifugally engaging elements; and engaging the centrifugally engaging elements into the teeth and driving the engine with the motor once the centrifugally engaging elements reach the speed of the teeth.

In any of the aspects or combinations of the aspects, the pinion gear may not be axially shiftable and may always be positioned at the same axial position throughout all operation.

In any of the aspects or combinations of the aspects, the centrifugally engaging elements may have a retracted position in which they do not engage the ring gear, and an engaged position in which they are engaged with the ring gear.

In any of the aspects or combinations of the aspects, the centrifugally engaging elements may rotate from the retracted to the engaged position in a direction that is opposite a rotating direction of the ring gear when an engine is running.

In any of the aspects or combinations of the aspects, the ring gear may not be axially movable during starting operation, engine operation, and engine deactivation.

In any of the aspects or combinations of the aspects, the centrifugally engaging elements may be rotatable rocker elements, each of the rotatable rocker elements having a cylindrical arm with an engaging end that swings out when moved, and a pocket underneath the arm that allows the rotatable rocker element when retracted to fit snugly into the pocket; wherein each of the rotatable rocker elements have a circular rotating end with an opening for a rod that attaches the rocker element to the pinion gear.

In any of the aspects or combinations of the aspects, the engine starter system may further comprise a damper coupled to the pinion gear and the ring gear.

In any of the aspects or combinations of the aspects, the centrifugally engaging elements may include mechanical diodes.

In any of the aspects or combinations of the aspects, the centrifugally engaging elements may be sprags.

In any of the aspects or combinations of the aspects, the centrifugally engaging elements may be rollers.

In any of the aspects or combinations of the aspects, the pinion gear may be on a secondary axis from the starter motor.

In any of the aspects or combinations of the aspects, the re-start request may occur before the engine spins to rest.

In any of the aspects or combinations of the aspects, the centrifugally engaging elements may operate as a one-way clutch so that the ring gear cannot drive the pinion gear.

In any of the aspects or combinations of the aspects, the one-way clutch may be positioned co-axial to a ring gear cam plate.

In any of the aspects or combinations of the aspects, rotational revolutions of the starter motor may be adjusted responsive to a sensed engine speed.

In any of the aspects or combinations of the aspects, the starter motor may be deactivated responsive to engine speed reaching a threshold speed.

In any of the aspects or combinations of the aspects, the method may further comprise spinning down the pinion gear to rest after ring gear tooth velocity exceeds speed of rocker arms in the centrifugally engaging elements.

In any of the aspects or combinations of the aspects, clunk may be mitigated by having a minimum of two centrifugally engaging elements in mesh when the pinion gear is spinning at or above deployment speed.

In any of the aspects or combinations of the aspects, gravity or the use of springs tuck the centrifugally engaging elements out of contact with the ring gear when the pinion gear is at rest.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. An engine starter system, comprising:
a ring gear coupled to an engine crankshaft; and
a pinion gear coupled to a starter motor, where the pinion gear has a plurality of centrifugally engaging elements for engaging an outer surface of the ring gear;
where the outer surface is included on an outer circumferential surface or an axially aligned surface on an axial side of the ring gear.

2. The engine starter system of claim 1, where the pinion gear is not axially shiftable and always positioned at a same axial position throughout all operation.

3. The engine starter system of claim 1, where the plurality of centrifugally engaging elements has a retracted position in which they do not engage the ring gear, and an engaged position in which they are engaged with the ring gear.

4. The engine starter system of claim 3, where the plurality of centrifugally engaging elements rotates from the retracted position to the engaged position in a direction that is opposite a rotating direction of the ring gear when an engine is running.

5. The engine starter system of claim 4, where the ring gear is not axially movable during starting operation, engine operation, and engine deactivation.

6. The engine starter system of claim 5, where the plurality of centrifugally engaging elements is a plurality of rotatable rocker elements, each of the plurality of rotatable rocker elements having a cylindrical arm with an engaging end that swings out when moved, and a pocket underneath the cylindrical arm that allows the rotatable rocker element to fit snugly into the pocket when retracted;
where each of the plurality of rotatable rocker elements has a circular rotating end with an opening for a rod that attaches the rotatable rocker element to the pinion gear.

7. The engine starter system of claim 1, further comprising a damper coupled to the pinion gear and the ring gear.

8. The engine starter system of claim 1, where the plurality of centrifugally engaging elements includes a plurality of mechanical diodes.

9. The engine starter system of claim 1, where the plurality of centrifugally engaging elements is a plurality of sprags.

10. The engine starter system of claim 1, where the plurality of centrifugally engaging elements is a plurality of rollers.

11. The engine starter system of claim 1, where the pinion gear is on a secondary axis from the starter motor.

12. A method, comprising:
during spinning down of an engine toward rest, responsive to a re-start request, spinning an axially and radially fixed pinion gear with a starter motor;
displacing a plurality centrifugally engaging elements of the axially and radially fixed pinion gear toward a ring gear with a plurality of teeth, where the plurality of teeth moves faster than the plurality of centrifugally engaging elements; and
engaging the plurality of centrifugally engaging elements into the plurality of teeth and driving the engine with the starter motor once the plurality of centrifugally engaging elements reaches a speed of the plurality of teeth;
where the plurality of teeth is positioned on an outer surface of the ring gear and where the outer surface is included on an outer circumferential surface or an axially aligned surface on an axial side of the ring gear.

13. The method of claim 12, where the re-start request occurs before the engine spins to rest.

14. The method of claim 13, where the plurality of centrifugally engaging elements operates as a one-way clutch so that the ring gear cannot drive the axially and radially fixed pinion gear.

15. The method of claim 14, where the one-way clutch is positioned co-axial to a ring gear cam plate.

16. The method of claim 12, where a plurality of rotational revolutions of the starter motor is adjusted responsive to a sensed engine speed.

17. The method of claim 12, where the starter motor is deactivated responsive to an engine speed reaching a threshold speed.

18. The method of claim 17, further comprising spinning down the axially and radially fixed pinion gear to rest after a ring gear tooth velocity exceeds a speed of a plurality of rocker arms in the plurality of centrifugally engaging elements.

19. The method of claim 18, where clunk is mitigated by having a minimum of two centrifugally engaging elements in mesh when the axially and radially fixed pinion gear is spinning at or above a deployment speed.

20. The method of claim 19, where gravity or the use of a plurality of springs tuck the plurality of centrifugally engaging elements out of contact with the ring gear when the axially and radially fixed pinion gear is at rest.

\* \* \* \* \*